United States Patent
Ranganathan et al.

(10) Patent No.: US 6,931,484 B2
(45) Date of Patent: Aug. 16, 2005

(54) METHOD AND APPARATUS FOR HANDLING MEMORY REFRESH AND MAINTENANCE OPERATIONS

(75) Inventors: Vasanth Ranganathan, Fair Oaks, CA (US); Alankar Saxena, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 10/134,230

(22) Filed: Apr. 25, 2002

(65) Prior Publication Data

US 2003/0204669 A1 Oct. 30, 2003

(51) Int. Cl.[7] ............................................. G06F 12/00
(52) U.S. Cl. .................. 711/106; 711/105; 365/185.25; 365/222; 345/530
(58) Field of Search .................. 711/105, 106; 365/185.25, 222; 345/530

(56) References Cited

U.S. PATENT DOCUMENTS 4,513,374 A * 4/1985 Hooks, Jr. ............. 365/230.04
6,310,814 B1 * 10/2001 Hampel et al. ............. 365/222
6,631,440 B2 * 10/2003 Jenne et al. ................. 711/105

* cited by examiner

Primary Examiner—Donald Sparks
Assistant Examiner—Bao Q Truong
(74) Attorney, Agent, or Firm—Robert D. Hinchliffe

(57) ABSTRACT

Embodiments of the present invention provide a method and apparatus for handling memory refresh and maintenance operations for graphics and other applications. In particular, refresh and memory operations are executed in two stages. A first stage includes, but is not limited to, memory channel temperature calibration, RAC auto current calibration, and RAC auto temperature calibration. First stage operations are scheduled when the primary display is not requesting data from memory, such as when the display is in its vertical blanking interval. A second stage includes, but is not limited to, memory refreshes and memory current calibration. These operations are scheduled when there are no display streams (primary and secondary) or when display is requesting in a low priority mode.

11 Claims, 4 Drawing Sheets

METHOD AND APPARATUS FOR HANDLING MEMORY REFRESH AND MAINTENANCE OPERATIONS

BACKGROUND

1. Field

The invention relates generally to computer systems, and in particular, to handling memory refresh and maintenance operations.

2. Background Information

Display streams of graphics applications typically require high bandwidth and low latency for memory data accesses. DRAMS, such as RDRAMs, are typically used as local memory storage devices in integrated chipsets. A DRAM's periodic maintenance operations include, but are not limited to, refresh, current calibration and channel temperature calibration. These operations can create a lot of overhead and choke the memory bandwidth, thus compromising performance. Moreover, a RDRAM ASIC cell (RAC) is an embedded cell that transmits and receives data to/from the RDRAM channel and requires periodic maintenance operations. Periodic maintenance operations associated with a RAC include, but are not limited to, auto current calibration and auto temperature calibration, and can also compromise performance.

In a typical implementation, when scheduling a refresh, all the pages that are currently open will have to be closed, and when any of the other maintenance operations (e.g., temperature calibration for RDRAM channel, RAC auto current calibration, RAC auto temperature calibration) are launched on the channel, there can be no data accesses to the RDRAM channel for a period of time, such as 285 ns. Typically, the bandwidth penalty is equal to the total of the following: time to flush existing requests, time to close all open pages, data access time delay due to launch of maintenance operations (e.g. 285 ns), and time to open pages.

What is needed therefore is a method and apparatus for effectively handling memory refresh and maintenance operations.

DETAILED DESCRIPTION

Figure 1:
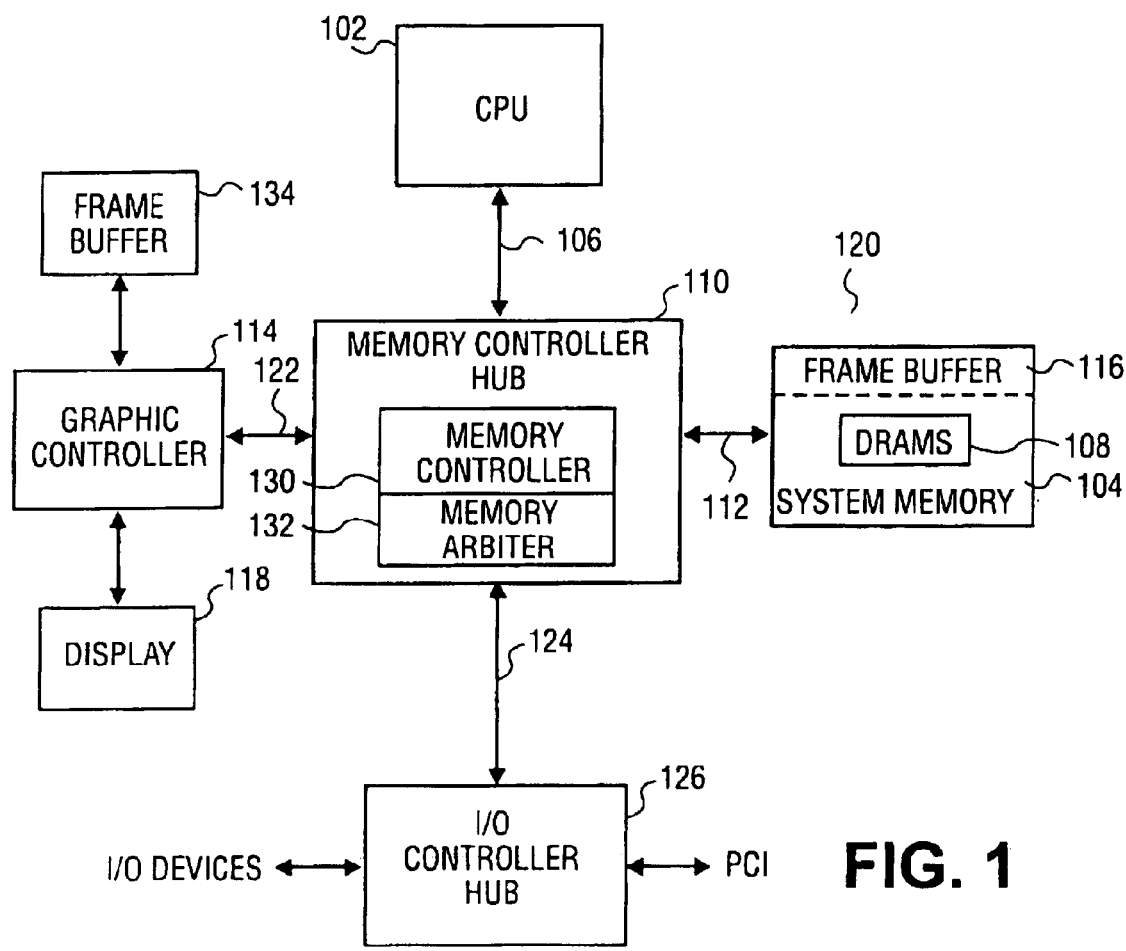
FIG. 1 illustrates a functional block diagram of an embodiment of an exemplary computer system embodying the present invention.

In the following description, numerous specific details are provided, such as the description of various computer system components in FIG. 1, to provide a thorough understanding of embodiments of the invention. One skilled in the relevant art will recognize, however, that the invention can be practiced without one or more of the specific details, or with other methods, components, etc. In other instances, well-known structures or requests are not shown or described in detail to avoid obscuring aspects of various embodiments of the invention.

Embodiments of the present invention provide a method and apparatus for handling memory refresh and maintenance operations for graphics and other applications. In particular, refresh and maintainence operations are executed in two stages. A first stage includes, but is not limited to, memory channel temperature calibration, RAC auto current calibration, and RAC auto temperature calibration. First stage operations are scheduled when the primary display is not requesting data from memory, such as when the display is in its vertical blanking interval. A second stage includes, but is not limited to, memory refreshes and memory current calibration. These operations are scheduled when there are no display streams (primary and secondary) or when display is requesting in a low priority mode.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 1 illustrates a functional block diagram of an embodiment 100 of an exemplary computer system embodying the present invention that can be utilized for processing video graphics and image data. In particular, computer system includes processor (CPU) 102 and system memory 104. System memory 104 is a memory in which the algorithms of the present invention as well as application programs are stored and from which processor 102 primarily executes. Memory 104 may be a random access memory (RAM), ROM or any other type of computer readable storage medium. For example, some embodiments of the present invention are implemented using RDRAM (RAMBUS DRAM). One skilled in the art will recognize that implementations with RDRAM are for illustrative purposes only and the invention is not limited to such implementations. When executed by processor 102, the algorithms of the present invention handle memory refresh and maintenance operations for graphics and other applications.

Processor 102 is coupled to memory controller hub 110 by host bus 106. Memory controller hub 110 includes memory controller 130 and is in turn coupled to system memory 104 by memory bus 112. Memory controller hub 110 is also coupled to graphics controller 114. Graphics controller 114 may be integrated into memory controller hub 110. Graphics controller 114 accesses local frame buffer 116 to store and retrieve graphics data stored therein for display on display 118. Display 118 can be a CRT, liquid crystal display, or other display device. For systems that use an UMA configuration, local frame buffer 116 is replaced by partitioning a portion of system memory 104 to create frame buffer 116, resulting in shared memory 120. Frame buffer 116 can be used to store the tiled image data for use. In such an embodiment, the data may be read from memory 104 and written to frame buffer 116 based on mapping algorithm of the present invention.

Graphics controller 114 is provided to control the rendering of text and images on display 118. Graphics controller 114 may embody a typical graphics accelerator generally known in the art to render three-dimensional data structures that can be effectively shifted into and from system memory 104. Graphics controller 114 may therefore be a master of AGP bus 122 in that it can request and receive access to a target interface within memory controller hub 110 to thereby obtain access to system memory 104. A dedicated graphics bus accommodates rapid retrieval of data from system memory 104. For certain requests, graphics controller 114 may further be configured to generate PCI protocol transactions on AGP bus 122. The AGP interface of memory controller hub 110 may thus include functionality to support both AGP protocol transactions as well as PCI protocol target and initiator transactions. Memory controller hub 110 is coupled to an I/O controller hub or other I/O interface (now shown). I/O controller interface can include a PCI interface for expansion cards as well as plurality of interfaces for I/O devices.

Figure 2:
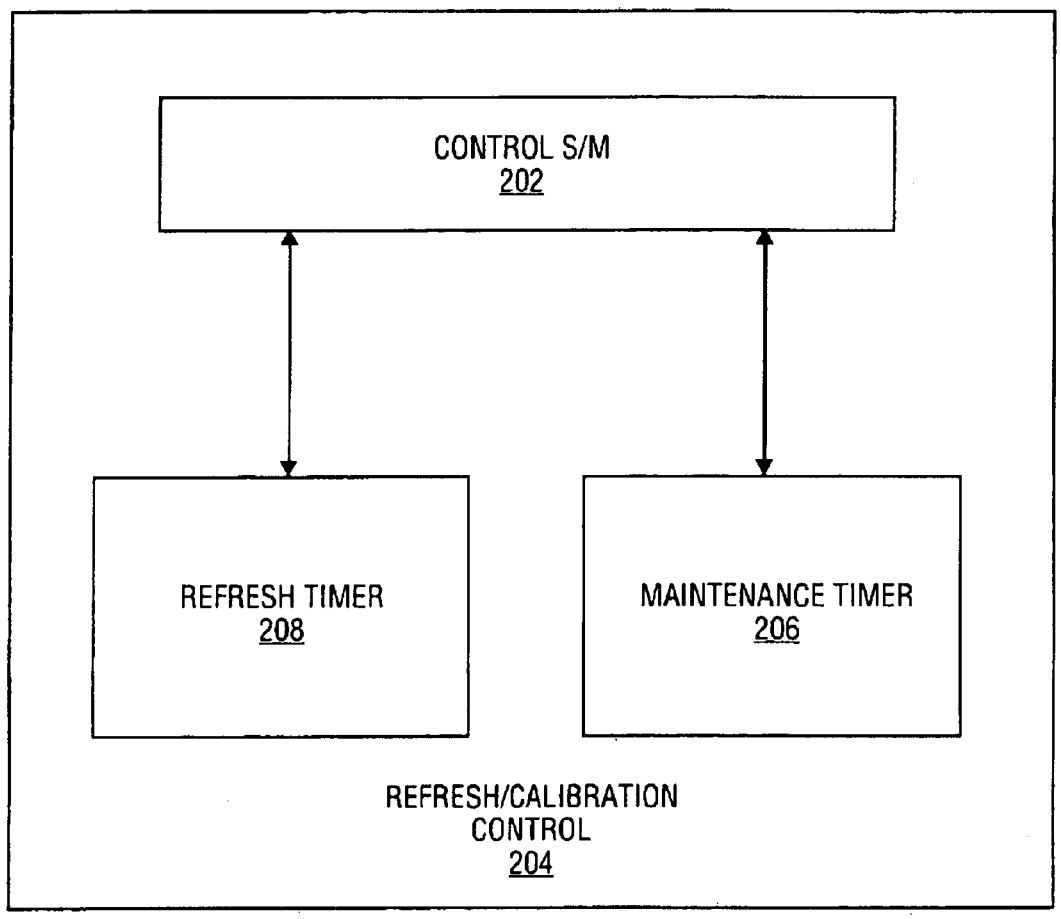
FIG. 2 illustrates a functional block diagram of an embodiment of system for handling memory operations, including memory refresh and maintenance operations.

FIG. 2 illustrates a functional block diagram of an embodiment 200 of system for memory refresh and calibration cycle handling for graphics and other applications. Refresh and calibration system includes state machine 202 and refresh and calibration controller 204. Refresh and calibration controller 204 generates various control signals in response to refresh and calibration signals and includes maintenance and refresh counters 206, 208 and timers for wait periods. Maintenance and refresh counters 206, 208 track when refreshes and maintenance cycles need to be scheduled, respectively. Threshold data are used by maintenance and refresh counters 206, 208. That is, if maintenance counter value 206 attains a threshold value, maintenance indicator 210 (for example, maintenance flag) is sent to controller 204 and processing of maintenance operations proceeds as described in detail below. Similarly, when refresh counter 208 value attains a threshold value, refreshes are collected and processed in accordance with refresh indicator 212 (for example, refresh flag) and other variables as described in detail below.

Figure 3:
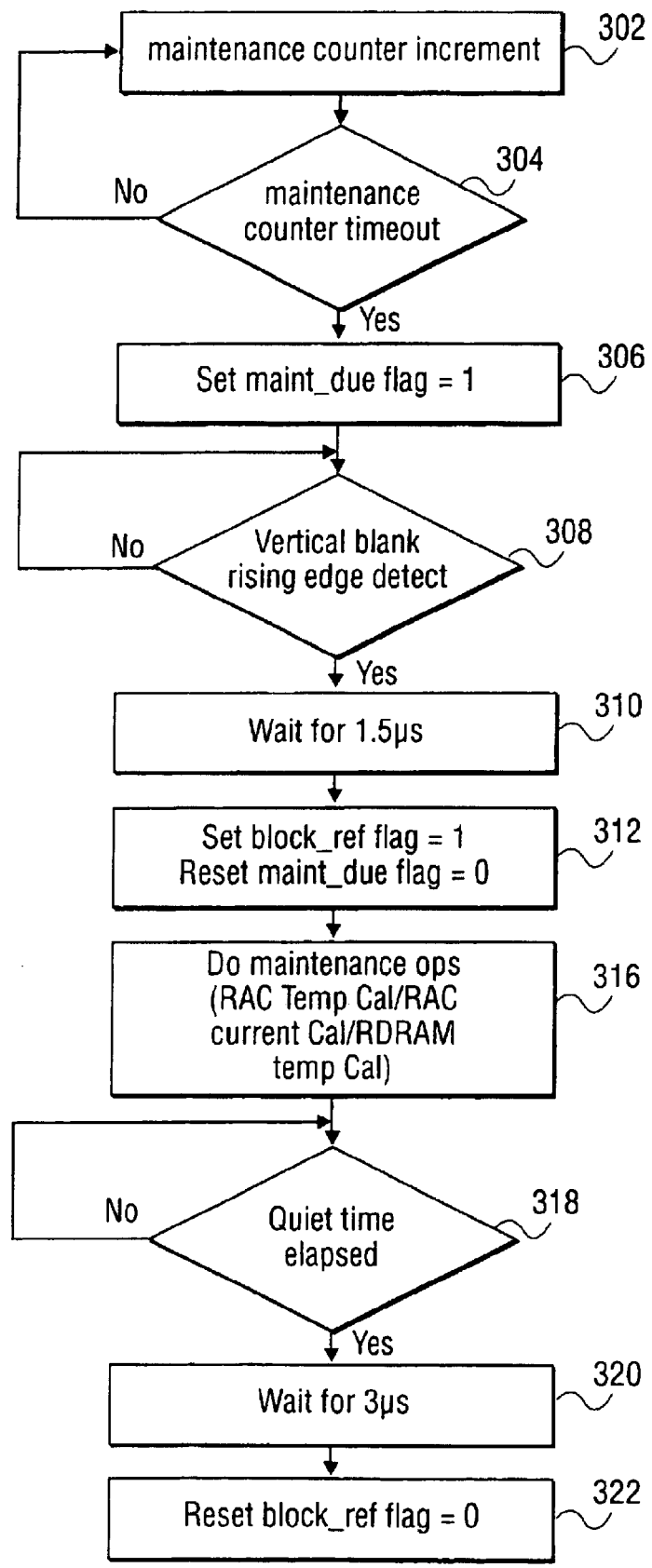
FIG. 3 illustrates a flow diagram of an embodiment of a method for handling maintenance operations.
Figure 4:
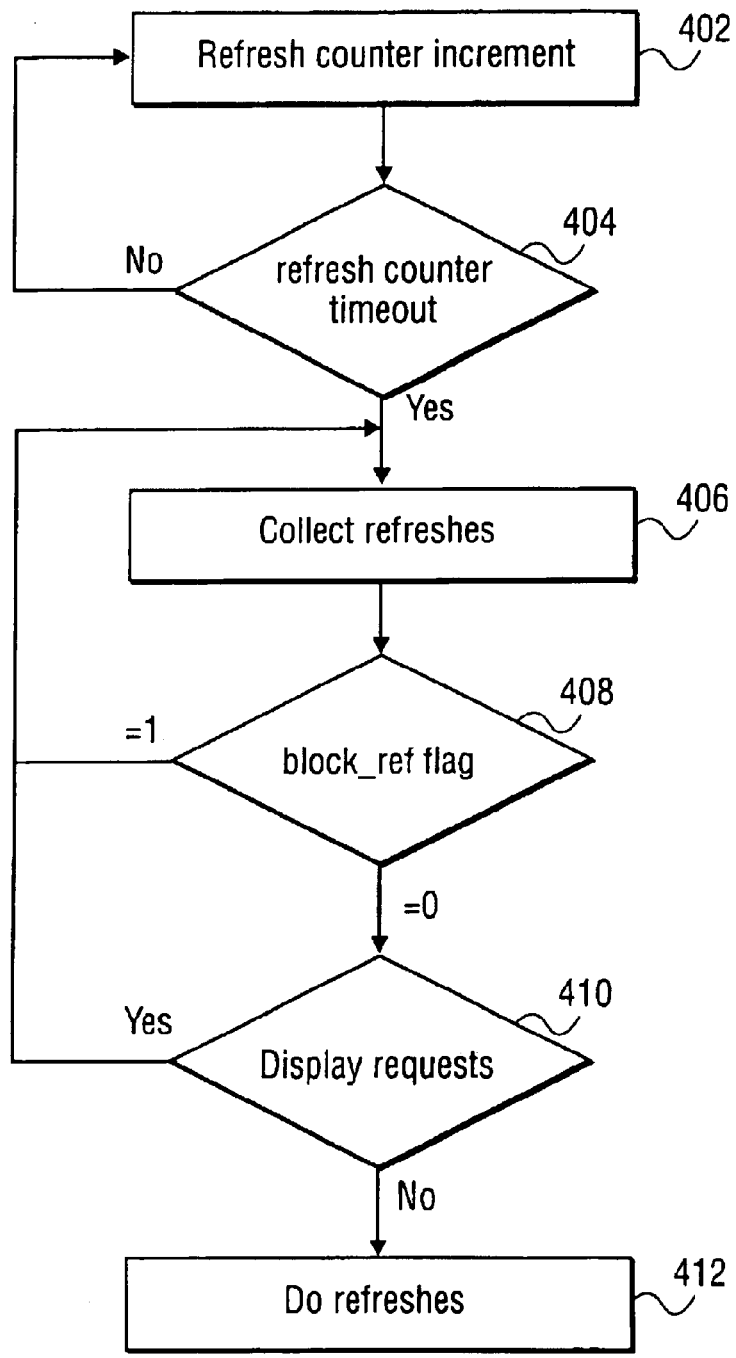
FIG. 4 illustrates a flow diagram of an embodiment of a method for handling refresh operations.

Maintenance and refresh operations are executed in stages, rather than continuously. As shown in FIG. 3, a first stage includes, but is not limited to, memory channel temperature calibration, RAC auto current calibration, and RAC auto temperature calibration. First stage operations are scheduled when the primary display is not requesting data from memory, such as when the display is in its vertical blanking interval. As shown in FIG. 4, a second stage includes, but is not limited to, memory refreshes and memory current calibration. These operations are scheduled when there are no display streams (primary and secondary) or when display is requesting in its low priority mode.

FIG. 3 illustrates a flow diagram of an embodiment 300 of a method for handling maintenance operations. Maintenance counter 206 tracks when maintenance cycles need to be scheduled and executed (step 302). When value of maintenance counter 206 reaches its threshold value t1 (for example, times out) (step 304), a maintenance indicator 210 is sent to controller 204 (step 306). Maintenance counter 206 may be a memory or counter and is initiated from the time the last maintenance operation was initiated or executed, depending on the particulars of the implementation. Maintenance counter 206 is electrically coupled to controller 204. In a typical implementation, the maintenance timer threshold value is approximately 80 milliseconds although one skilled in the art will recognize that the threshold value can vary and is not limited to the implementation described herein.

When maintenance counter 206 reaches its threshold value (step 304), maintenance indicator 210 is set to indicate that the maintenance cycle is due (step 306). In a typical implementation, a maintenance flag is set to "1."

State machine 202 waits for when the primary display is not requesting data from memory, such as when the display is in its vertical blanking interval (step 308). In a typical implementation, when a rising edge of a vertical blanking signal is detected (step 308), state machine 202 waits for a predefined time interval t2 (step 310), such as 1.5 us. Time interval t2 provides an interval to allow any display requests in the vertical blanking interval pipeline to be completed prior to initiation of maintenance operations.

After time interval t2 has elapsed, refresh indicator 212 is set to block refreshes from being sent to memory while maintenance operations are being executed (step 312). In a typical implementation, block refresh flag is set to "1." Maintenance indicator 210 is set to indicate that the maintenance cycle is no longer due (step 312). In a typical implementation, maintenance flag is set back to "0."

Maintenance operations, such as the temperature calibration, RAC auto current calibration and RAC auto temperature calibration, are then executed (step 314).

A predefined quiet period t3 is initiated (step 316) and all cycles to the memory are blocked in this interval, but memory pages may be left open, rather than closed. As used herein, a "page" refers to a block of data stored within a same row of DRAMs that comprise system memory. A quiet period t3, typically 285 nanoseconds, is allotted for execution of maintenance operations (step 316).

Once quiet period has elapsed (step 316), state machine 202 waits for a predefined time interval t4 (step 318), typically 3 us, to allow display data to be fetched from memory. After the predefined time interval t4 has elapsed, refresh indicator 212 is reset to allow refreshes if conditions are met as described in detail below (step 320). In a typical implementation, block refresh flag is set back to "0." Refreshes that are pending get executed at that time.

FIG. 4 illustrates a flow diagram of an embodiment 400 of a method for handling refresh operations. Refresh counter 208 tracks when refreshes need to be scheduled and executed (step 402). Refresh counter 208 may be a memory or counter and is initiated from the time the last maintenance operation was initiated or executed, depending on the particulars of the implementation. Refresh counter 208 is electrically coupled to controller 204. In a typical implementation, the refresh timer threshold value is approximately 15.6 microseconds although one skilled in the art will recognize that the threshold value can vary and is not limited to the implementation described herein.

When refresh counter 208 value reaches its threshold value t5 (for example, times out) (step 404), refreshes are collected (step 406). Refreshes are collected each time refresh counter 208 times out.

If refresh indicator 212 is set to block refreshes, refreshes continue to get collected (step 406) but not executed. If refresh indicator 212 is set to allow refreshes, refreshes that had been collected (step 406) are further processed. In a typical implementation, refreshes are blocked when block refresh flag is set to "1" and allowed when block refresh flag is set to "0."

Thus, in step 408, the state of the refresh indicator 212 set during the maintenance or other operation phase (steps 312 and 320) is determined. In a typical implementation, when refresh flag is set to "1," it indicates that refreshes should not be executed yet and maintenance or other first stage operations are active. Refreshes continue to be collected (step 406).

As previously noted, maintenance and refresh operations are executed in stages, rather than continuously in a stretch. A second stage includes, but is not limited to, memory refreshes and memory current calibration. These operations are scheduled when there are no display streams (primary and secondary) or when display is requesting in its low priority mode.

In particular, when refresh indicator 212 allows for refreshes (step 408), an arbitration priority determines if there are any more display requests (step 410). If display requests having a higher priority than refresh requests are present (step 410), refreshes continue to be collected and execution of refreshes collected is delayed (step 406).

In a typical implementation, requests are processed based upon an initial predefined priority status. In particular, a memory arbiter includes priority arbitration logic for determining which agents have pending requests and which of those has priority. A priority can be assigned to each agent, and when two or more agents make simultaneous requests, then the higher-priority agent is chosen to access the resource while the lower-priority agent is delayed. Such priority-based arbitration maximizes performance of higher-priority agents at the expense of lower-priority agents.

In a typical implementation, display requests are assigned as higher priority over refreshes and are thus executed first. The priorities are fixed in the arbiter per the requesting agent. One of the highest priority agents is the graphics display. Memory arbiter services high priority agents such as display FIFOs to ensure that display requests are given highest priority. Operations, such as refreshes, are assigned lower priority status. In a typical implementation, memory arbiter arbitrates between requests from two display engines and the refresh requests and sends the refresh cycles to the channel only when there are no display requests.

Other prioritization sequences can be implemented, and so the present invention is not limited by the specific order in which resource blocks are serviced. For example, in one embodiment, refreshes are given a higher priority status than display requests and refreshes are executed accordingly. In another embodiment, once the number of high priority display or other requests reaches a predefined limit, display refreshes are executed.

Once the display de-asserts priority or there are no display requests, refreshes are executed (step 412).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for refreshing and maintaining a memory device comprising:

tracking when maintenance cycles need to be scheduled and executed by setting a maintenance indicator to indicate that the maintenance cycle is due when value of a maintenance counter attains a first time value;

waiting for a predefined second time value when a rising edge of a vertical blanking signal is detected; and executing refresh and memory operations in a first stage and a second stage wherein the first stage includes executing calibration operations and the second stage includes memory refreshes.

2. The method claimed in claim 1 wherein the second time value allows display requests to be completed prior to initiation of maintenance operations.

3. The method claimed in claim 2 further comprising:
setting the maintenance indicator to indicate that the maintenance cycle is no longer due.

4. The method claimed in claim 3 further comprising:
initiating a predefined quiet third time value and blocking cycles to the memory in the third time value while leaving memory pages open.

5. The method claimed in claim 4 wherein the first stage comprises:
executing memory channel temperature calibration, RAC auto current calibration, and RAC auto temperature calibration.

6. A machine-readable medium having stored therein a plurality of machine-readable instructions executable by a processor to refresh and maintain a memory device comprising:
instructions to track when maintenance cycles need to be scheduled and executed by setting a maintenance indicator to indicate that the maintenance cycle is due when value of a maintenance counter attains a first time value;
instructions to wait for a predefined second time value when a rising edge of a vertical blanking signal is detected; and
instructions to execute refresh and memory operations in a first stage and a second stage wherein the first stage includes executing calibration operations and the second stage includes memory refreshes.

7. The medium claimed in claim 6 wherein the second time value allows display requests to be completed prior to initiation of maintenance operations.

8. The medium claimed in claim 7 further comprising:
instructions to set the maintenance indicator to indicate that the maintenance cycle is no longer due.

9. The medium claimed in claim 8 further comprising:
instructions to initiate a predefined quiet period t3 and blocking cycles to the memory in the third time value while leaving memory pages open.

10. The medium claimed in claim 9 wherein the first stage comprises:
instructions to execute memory channel temperature calibration, RAC auto current calibration, and RAC auto temperature calibration.

11. An apparatus for handling memory refresh and maintenance operations, comprising:
a memory device; and
a controller, operatively coupled to the memory device, for executing refresh and memory operations in a first and second stage wherein the first stage includes executing calibration operations and the second stage includes memory refreshes;
wherein the controller tracks when maintenance cycles need to be scheduled and executed;
wherein the controller sets a refresh indicator to block refreshes from being sent to memory while maintenance operations are being executed; and
wherein the first stage comprises executing memory channel temperature calibration, RAC auto current calibration, and RAC auto temperature calibration.

* * * * *